W. T. AMBROSE.
SELF WATERING FLOWER POT.
APPLICATION FILED JUNE 5, 1920.
1,383,368.
Patented July 5, 1921.
2 SHEETS—SHEET 1.
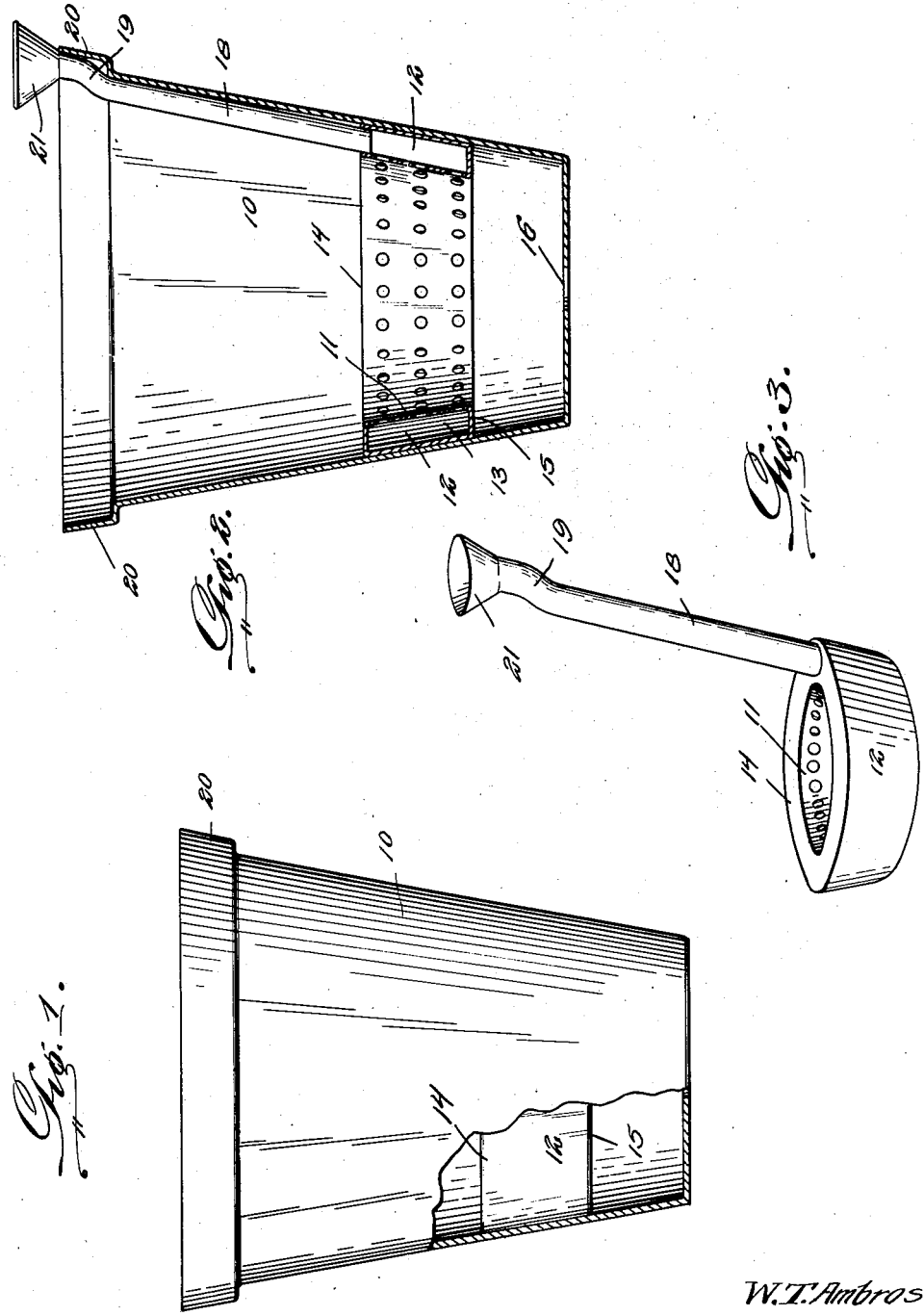

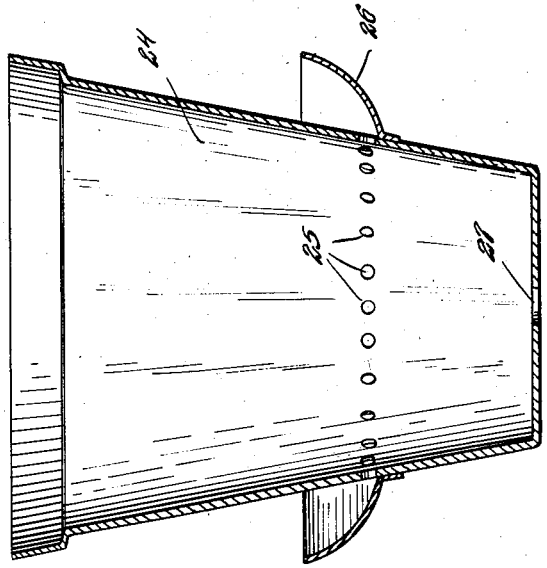
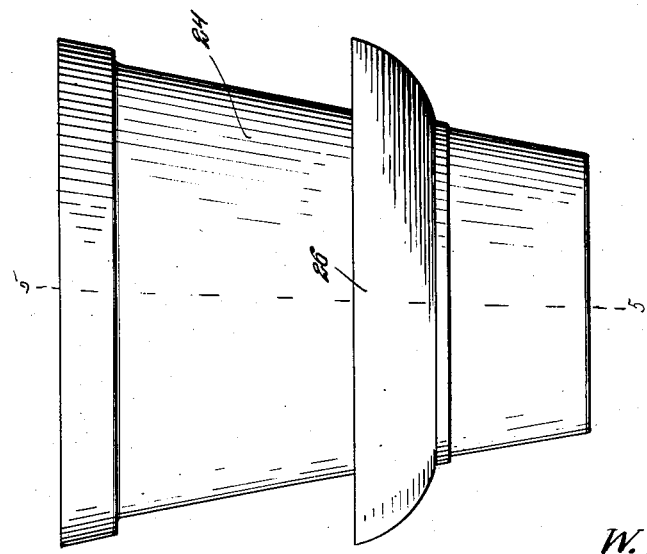

UNITED STATES PATENT OFFICE.

WILLIAM THOMAS AMBROSE, OF MEMPHIS, TENNESSEE.

SELF-WATERING FLOWER-POT.

1,383,368.     Specification of Letters Patent.     Patented July 5, 1921.

Application filed June 5, 1920. Serial No. 386,693.

*To all whom it may concern:*

Be it known that I, WILLIAM T. AMBROSE, a citizen of the United States, residing at Memphis, in the county of Shelby and State of Tennessee, have invented new and useful Improvements in Self-Watering Flower-Pots, of which the following is a specification.

This invention relates to self watering flower pots or the like and comprehends a construction by means of which the plant is watered at its roots, in counter-distinction to watering plants at the top, which often cakes the dirt and kills or injures the plant.

The nature and advantages of the invention will be better understood when the following detail description is read in connection with the accompanying drawings, the invention residing in the construction, combination and arrangement of parts as claimed.

In the drawings forming part of this application, like numerals of reference indicate similar parts in the several views and wherein:

Figure 1 is a side elevation of a flower pot partly broken away and constructed in accordance with the preferred form of the invention.

Fig. 2 is a vertical sectional view taken through Fig. 1.

Fig. 3 is a perspective view of the water container and its filling tube.

Fig. 4 is a view similar to Fig. 1 of a modified form of the invention.

Fig. 5 is a sectional view taken on the line 5—5 of Fig. 4.

Referring to the drawings in detail, and particularly Figs. 1 to 3 inclusive, 10 indicates the flower pot of the usual well known construction and in which is arranged a water container, by means of which the plant is properly watered about its roots. The water container includes spaced inner and outer annular walls 11 and 12 respectively defining a water chamber 13 by the intervening space therebetween, these walls being connected by the top and bottom walls 14 and 15 respectively. The container in its entirety is suitably tapered to accommodate itself to the pot 10 it being positioned within the latter in spaced relation to the bottom of the pot as clearly shown. The bottom of the pot 10 is provided with the usual opening 16. The water container may be constructed from any suitable material and of any desired size without departing from the spirit of the invention, the inner wall 11 being perforated as shown so that the water from the container escapes through said apertures or perforations to saturate the plant about its roots, it being understood that the soil of the plant is arranged within the confines of the inner wall 11 of the container. Rising from the top 14 of the container, and communicating therewith is a filling tube 18 which is offset as at 19 to lie close to the flared portion 20 of the pot 10, the tube 18 terminating to provide a funnel shaped head 21 to facilitate filling or supplying the container with water. This construction does away with watering the plant at the top, which practice often results in caking the dirt and injuring the plant if not killing the latter. The plant is not only properly watered about its roots by reason of the construction described, but the water will not stagnate or rot the roots as is frequently the result in other so called self watering flower pots. The water entering the space beneath the container will pass from the flower pot through the opening in the bottom thereof.

In Figs. 4 and 5 I have illustrated a modified form of the invention, wherein the flower pot is indicated at 24 and provided at an appropriate point in its length with a circumferential series of apertures 25. Secured to the flower pot 24 at a point beneath this series of apertures, is a collar or the like 26 which has its body portion curved and flared away from the body portion of the flower pot to define a water trough. The supply of water from the trough passes through the apertures 25 in the flower pot and properly waters or saturates the plant about its roots, thus materially assisting in the growth of the plant without in any way injuring the latter. The flower pot is also provided with the usual water escape opening 27 in the bottom thereof.

While it is believed that from the foregoing description the nature and advantages of the invention will be readily apparent, I desire to have it understood that I do not limit myself to the details herein shown and described, as such changes may be resorted to when desired as fall within the scope of what is claimed.

What I claim as new is:

A water container of the character described including spaced inner and outer continuous walls, a bottom and a top, said inner wall being perforated and a filling tube communicating with said container and projecting from the top thereof.

In testimony whereof I affix my signature.

WILLIAM THOMAS AMBROSE.